Jan. 7, 1958   M. A. SANT ANGELO   2,819,438
DATA TRANSMISSION AND CONTROL SYSTEM
Filed June 16, 1955   2 Sheets-Sheet 1
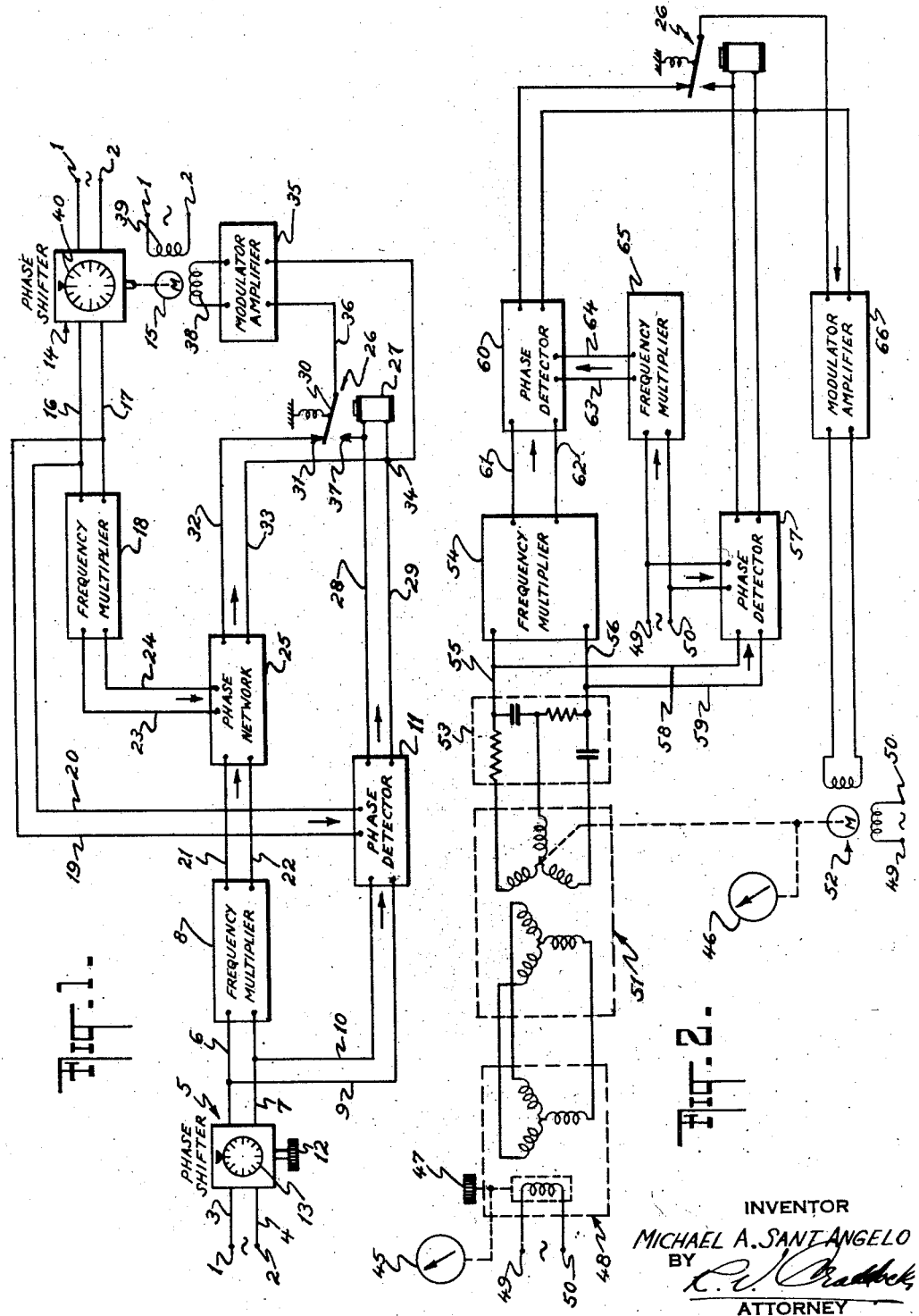
INVENTOR
MICHAEL A. SANT ANGELO
BY
ATTORNEY Jan. 7, 1958   M. A. SANT ANGELO   2,819,438
DATA TRANSMISSION AND CONTROL SYSTEM
Filed June 16, 1955   2 Sheets-Sheet 2
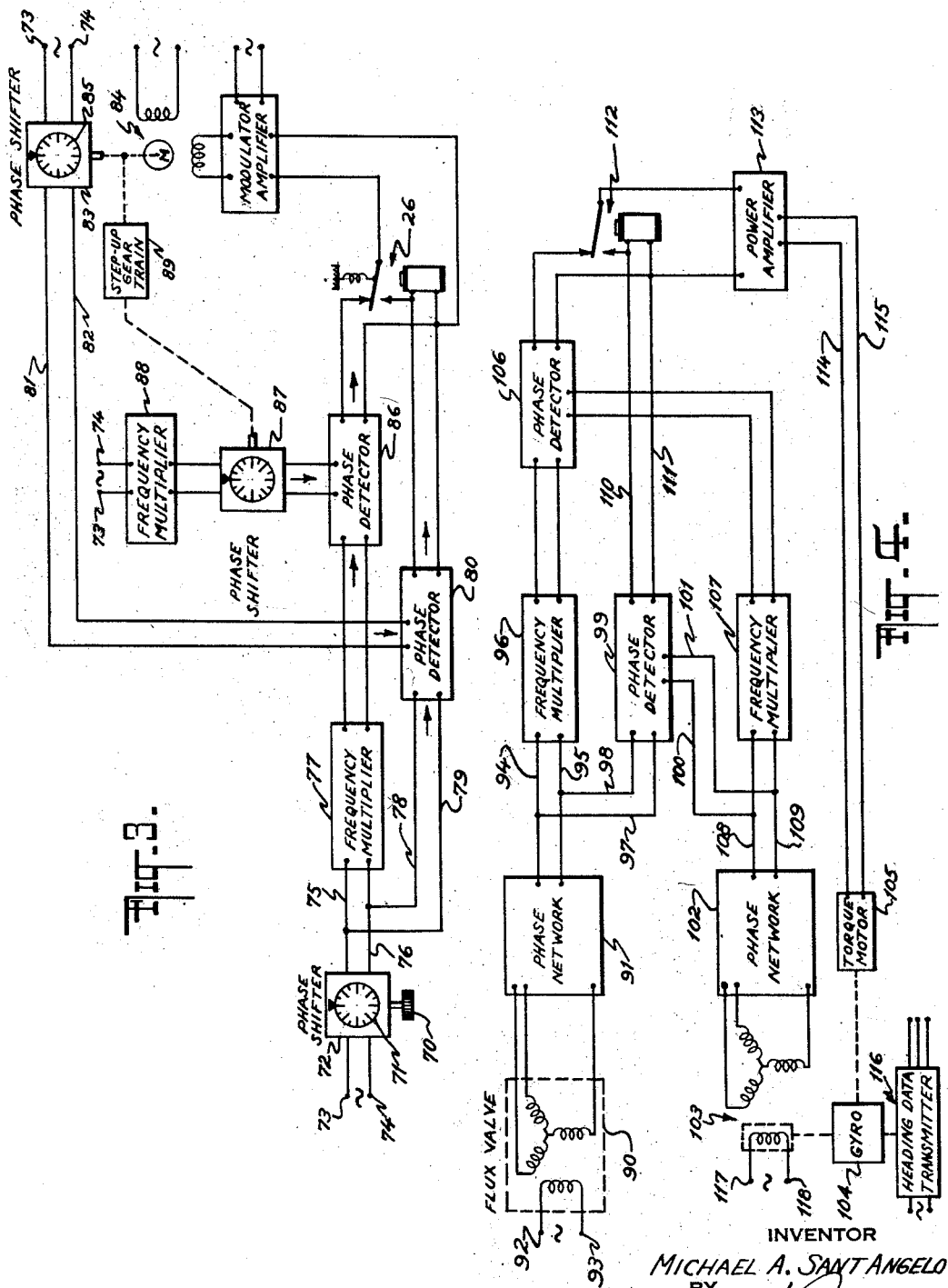
INVENTOR
MICHAEL A. SANT ANGELO
BY
ATTORNEY United States Patent Office 2,819,438
Patented Jan. 7, 1958

2,819,438

DATA TRANSMISSION AND CONTROL SYSTEM

Michael A. Sant Angelo, Levittown, N. Y., assignor to Sperry Rand Corporation, a corporation of Delaware Application June 16, 1955, Serial No. 515,937

6 Claims. (Cl. 318—28)

This invention relates to improvements in data transmission and control systems of the phase-comparison type. More particularly, it concerns a novel and simplified arrangement in a system of this character for providing fine-coarse performance.

A number of different categories of data transmission systems are known for positioning an object in accordance with the position of a remotely-located controller device. One category accomplishes this performance by the comparison of signal amplitudes. For example, a variable transformer type of signal generator, the output of which varies in amplitude according to the angular displacement given to its rotor and reversing in phase depending upon the direction of the displacement, may be electrically connected to a distant similar transformer device, the rotor of which is mechanically connected to the object to be controlled so that it is angularly displaced according to changes in position of the object. A departure from a predetermined positional relationship of the transmitter and receiver rotors gives rise to an error signal which is usually amplified for energizing a motor drivably connected to the controlled object, whereupon the motor positions the object to reduce the error signal to zero, thereby to restore the predetermined positional relationship.

Another category of data transmission system employs the technique of comparing the electrical phases of transmitted and received signals and positioning the object to be controlled in a manner to reduce any phase difference between the signals to zero. In this instance, the transmitter may be a phase shifter, the output of which continuously varies in phase according to the angular displacement given to a movable element thereof and may be electrically connected to form one input to a phase-comparison device, while a distant similar phase shifter having its movable element mechanically connected to the object to be controlled may be connected to provide a second input to the comparison device. If the phase-comparison device is a phase detector, the output thereof is zero for a given phase difference between the incoming signals and varies in magnitude as a function of departures of the phase difference from its given value, being of one polarity for increased differences and of opposite polarity for decreased differences. By amplifying the output of the phase-comparison device and connecting the same to energize a motor drivably connected to the controlled object, the object will be driven to a position having a predetermined relation to the position of the remotely-located controller device.

Each of the foregoing categories of data transmission systems have been modified in the past to yield higher resolution or sensitivity and to be less subject to ill effects attributable to signal generator inaccuracies. A common expedient for achieving this end has been to employ a plurality of transmitter units driven at different speeds and cooperating with a like plurality of receiver units similarly driven. In the amplitude comparison category, for example, a so-called coarse transmitter is driven in a 1:1 speed relation with its positioning controller while a fine transmitter may be driven, for instance, in a 36:1 speed relation therewith. At the receiver end, receiver units having speed ratios corresponding to those of their counterparts at the transmitter end are arranged, one or the other, to energize the object-positioning motor, depending on the magnitude of the coarse receiver output. That is to say, means are provided for transferring control of the motor from one to the other of the fine and coarse channels as the system error becomes greater or less than a predetermined value.

The fine-coarse modification of data transmission systems has also been applied to systems of the phase-comparison category in an analogous manner. Thus, separate phase shifters operating at different speeds have been provided at the transmitter end of a transmission system to cooperate with like receivers at the receiver end for positioning the controlled object in accordance with one or the other of the fine and coarse signals, depending on the magnitude of the coarse error signal output of the coarse phase-comparison device.

While the advantages of a fine-coarse system are usually desired, the use of such systems as have been known in the past has been prevented in certain instances by one or more of a number of disadvantages. For example, step-up gearing for driving one transmitter unit faster than the outer cannot be tolerated where positional data to be transmitted must be taken directly from the sensitive element of a gyroscope or other device where mechanical loading is a critical factor. Another instance where prior art fine-coarse systems have necessarily been ruled out in favor of a single-speed type of system, although the fine-coarse system advantages are desired, is where the data to be transmitted is not derived from a movable pilot element. This situation arises, for example, in a compass system where flux valve data is employed to slave a directional gyroscope for providing aircraft heading information.

Accordingly, the principal object of the present invention is to provide an improved phase-comparison type of data transmission and control system.

Another object of the invention is the provision of a novel data transmission and control system of the above character employing fine-coarse control techniques for increased sensitivity or resolution in the absence of multiple-speed data transmission signal units.

Another object of the invention is to provide a novel data transmission and control system of the above character wherein the data to be transmitted may be directly obtained from a non-movable pilot element.

With the foregoing and other objects in view, the present invention includes the novel elements and combinations and arrangements thereof described below and illustrated in the accompanying drawings, in which, Figs. 1 and 2 are block diagrams of data transmission and control systems embodying the present invention;

Fig. 3 is another block diagram of a data transmission and control system embodying the present invention, wherein multi-speed techniques are combined with freqency multiplication techniques for increased accuracy and resolution; and Fig. 4 is a block diagram of a compass and heading data transmission system embodying the present invention.

Referring to Fig. 1, a pair of terminals 1, 2 of a source of alternating current are respectively connected via leads 3, 4 to the input side of a phase-shifter device 5, the output of which is fed via a pair of leads 6, 7 to a frequency multiplier 8 and also via a pair of leads 9, 10 to a phase detector 11. Phase-shifter 5 is preferably provided with a rotatable element, the rotation of which produces a corresponding shift in the phase of the alternating current supplied on leads 3, 4. While any of a number of well-known phase-shifter devices operable in this fashion may be used, it is preferred to employ a resolver-like arrangement generally of the type described in U. S. Patent 1,667,497. Thus, by manipulation of a handle 12 mechanically connected to the rotatable element of the phase shifter, a signal of continuously variable phase may be obtained on output leads 6, 7 and 9, 10. A calibrated dial 13, driven simultaneously with phase shifter 5, is provided for furnishing an indication of the angular displacement given to the phase shifter, hence of the phase shift introduced.

A second phase shifter 14, substantially identical to device 5, and also receiving its alternating current input from terminals 1, 2, is mechanically driven along with an indicator dial 40 by a two-phase induction motor 15. The output of phase shifter 14 is fed via a pair of leads 16, 17 to a frequency multiplier 18 and also via a pair of leads 19, 20 to phase detector 11 for comparison with the signal fed to detector 11 via leads 9, 10. Frequency multipliers 8, 18 have the same factor of multiplication so that the signal on output leads 21, 22 of multiplier 8 is of the same frequency as the signal on output leads 23, 24 of multiplier 18. The respective frequency multiplier signals form the two inputs of a phase detector 25 similar to detector 11.

A control transfer arrangement is provided whereby the output of phase detector 25 is in control of motor 15 only for such times as the output of detector 11 does not exceed a predetermined magnitude chosen to prevent ambiguity. Thereafter, the output of phase detector 11 is automatically placed in control of motor 15. A suitable form of control transfer arrangement may comprise an electromagnetic relay 26 having a winding 27 connected to receive the output of detector 11 via a pair of leads 28, 29. Winding 27 controls a movable contact 30 which, in the unactuated state of relay 26, resides on an upper fixed contact 31 connected to detector 25 via one output lead 32. The other output lead 33 of detector 25 is connected to a junction point 34 on lead 29 and thence to the input side of a modulator amplifier 35. A lead 36 from movable contact 30 completes the input circuit of amplifier 35. Thus, as viewed in Fig. 1, the output of detector 25 forms the input to amplifier 35 so long as relay 26 remains unactuated. When the output of detector 11 is sufficient to actuate relay 26 through energization of winding 27, movable contact 30 leaves contact 31 and bears against a lower fixed contact 37 which is electrically connected to lead 28. Upon this occurrence, the input of amplifier 35 is switched from receiving the output of detector 25 to receiving the output of detector 11. The output of amplifier 35 is connected across the control winding 38 of motor 15, while the source terminals 1, 2 are connected across the motor's fixed field winding 39.

Preferably, relay 26 is actuated when the output of detector 11 represents a departure of 90°/n from a predetermined desired positional relationship of dials 13, 40 corresponding to a null detector output, where n is the common multiplication factor of frequency multipliers 8, 18. However, ambiguity will still be prevented if actuation of relay 26 is initiated at any time before the dials are 180°/n from their desired positional relationship.

While an electromagnetic relay 26 has been described as a means for transferring control from detector 25 to detector 11, and vice-versa, it will be apparent that an electronic switching arrangement employing a thyratron, for example, may be used instead with similar effect.

By the arrangement of Fig. 1, dial 40 is made to follow the movements of dial 13. When the dial positions differ by a large amount from their predetermined positional relationship, motor 15 is controlled by the coarse signal output of detector 11. Then when this positional difference has been reduced to a given amount, control of motor 15 is automatically transferred to the fine signal output of detector 25, whereupon the sensitivity of the system is increased for small positional disagreements. Thus, by employing frequency multiplication of signal data, single-speed transmitter and receiver units are rendered capable of providing the sensitivity advantages otherwise attained by using multi-speed units.

Fig. 2 depicts a variation of the system shown in Fig. 1, and particularly serves to illustrate one form the invention may take where variable transformer units, such as selsyns, are employed for signal purposes. A dial indicator 45, the movements of which are to be duplicated by a remotely located dial indicator 46, is positioned by a knob 47 which is mechanically adapted simultaneously to position the rotor of a selsyn transmitter 48 energized from a source of alternating current across a pair of terminals 49, 50. Selsyn 48 is connected in back-to-back relation with a selsyn differential generator 51, the rotor of which is positioned by a two-phase induction motor 52 which simultaneously drives indicator 46. The rotor winding of selsyn 51 is electrically connected through a phase network 53 to the input terminals of a frequency multiplier 54 via a pair of leads 55, 56 and also through network 53 to a phase detector 57 via a pair of leads 58, 59. Phase network 53 contains a pair of resistors and a pair of capacitors arranged in a manner described in United States Patent No. 2,627,598 granted February 3, 1953, in the name of J. E. Browder et al., whereby a constant amplitude signal of continuously variable phase according to angular movements of the rotors of selsyns 51, 48 is provided on output leads 55, 56 and 58, 59. Thus, the phase of these outputs relative to the phase of the alternating voltage across source terminals 49, 50 is a measure of the positional disagreement of indicators 45, 46.

In order to provide a reversible polarity error signal that cyclically varies in magnitude in dependence upon the phase difference between the signal on leads 58, 59 and the source current, the other input of phase detector 57 is taken from source terminals 49, 50, thereby to provide the requisite error signal in the output of detector 57. A second reversible polarity phase error signal that cyclically varies in magnitude at a faster rate than the output of detector 57 is provided by a phase detector 60 which receives one of its inputs from frequency multiplier 54 via a pair of leads 61, 62 and the other of its inputs via a pair of leads 63, 64 bearing the output of a frequency multiplier 65, the input leads of which are respectively connected to source terminals 49, 50, and which has the same multiplication factor as multiplier 54. Again, as in Fig. 1, the error signal output of the detector receiving the higher frequency inputs is in control of motor 52 only for such times as the output of the other detector does not exceed a predetermined magnitude chosen to prevent ambiguity. Accordingly, the control transfer arrangement including electromagnetic relay 26 depicted in Fig. 1 may be again employed between the respective phase detectors and a modulator amplifier 66 corresponding to amplifier 35 (Fig. 1) connected to the control winding of motor 52, the fixed field motor winding being energized from the source terminals 49, 50.

By the arrangement of Fig. 2, therefore, an angular displacement of the pilot device (controller knob 47) gives rise to a phase shift in the source current. The phase shift is separately detected in a pair of phase detectors, one of which receives frequency multiplied versions of the source current both as phase shifted and as supplied from source terminals 49, 50 while the other phase detector receives source frequency versions of the source current both as phase shifted and as supplied from terminals 49, 50. The respective detector outputs are placed, one or the other, depending on their relative magnitudes, in control of motor 52 to actuate the same in a manner to reduce the outputs to zero. At zero detector output, the indicators 47, 46 have a predetermined positional relationship.

Referring now to Fig. 3, a phase comparison system embodying the present invention is shown with a variation which incorporates both multi-speed and frequency multiplication techniques. A knob 70 is mechanically adapted to simultaneously position an indicator dial 71 and the movable element of a phase shifter 72 energized from a source of alternating current across terminals 73, 74. The constant amplitude, variable phase output of phase shifter 72 is connected via a pair of leads 75, 76 to the input terminals of a frequency multiplier 77 and also via a pair of leads 78, 79 to one set of input terminals of a phase detector 80. The other set of input terminals of detector 80 is connected via a pair of leads 81, 82 to the source terminals 73, 74 through a second phase shifter 83, the movable element of which is angularly positioned by means of a mechanical connection to the output shaft of a two-phase induction motor 84. Associated with phase shifter 83 and driven simultaneously therewith is an indicator dial 85 which is to be maintained in a given positional relationship with indicator dial 71.

The output of frequency multiplier 77 is connected to one set of input terminals of a phase detector 86, the other set of input terminals of this detector being connected to the output of a phase shifter 87 which is energized through a frequency multiplier 88 from source terminals 73, 74. The multiplication factors of multipliers 77, 78 are equal so that the respective inputs of detector 86 are of the same frequency higher than the source frequency. However, in order to provide the so-called fine error signal output from detector 86, it is necessary to drive phase shifter 87 at the speed of phase shifter 83 multiplied by the multiplication factor of frequency multipliers 77, 78. Accordingly, phase shifter 87 is driven by motor 84 through a step-up gear train 89 having the requisite multiplication factor.

The control of motor 84 is from fine error detector 86 until the output of coarse error detector 80 exceeds a predetermined magnitude whereupon the latter output automatically takes over control of the motor. Hence, the arrangements, including relay 26, discussed in Figs. 1 and 2 for performing this function may again be employed.

Fig. 4 illustrates a heading data transmission system for a dirigible craft. This system employs a flux valve, the output of which is used to slave a directional gyroscope having a pick-off which provides the requisite heading data. The phase comparison techniques of the present invention are readily suited for the flux valve system, notwithstanding the fact that the pilot device (flux valve) is devoid of moving parts. In this regard, therefore, a flux valve 90 having the usual three output leads and excited from a source of alternating current across a pair of supply terminals 92, 93 is connected to a phase network 91 such as network 53 (Fig. 2). The output of network 91 is constant in amplitude but is continuously variable in phase relative to the source phase according to the orientation of the flux valve in the earth's magnetic field. The output of network 91 is fed via a pair of leads 94, 95 to a frequency multiplier 96 and also via a pair of leads 97, 98 to one set of input terminals of a phase detector 99. The other set of input terminals of detector 99 are connected via a pair of leads 100, 101 to the output of a phase network 102 substantially identical to network 91 but receiving its three-wire input from the stator of a selsyn 103, the rotor of which is connected to a directional gyroscope 104 so as to be positioned according to the angular movements, with respect to the craft, of the gyroscope about its vertical axis. Because of the well-known frequency-doubling characteristic of a flux valve, the rotor of selsyn 103 is excited from a pair of terminals 117, 118 which supply an alternating current of twice the frequency that is supplied via terminals 92, 93 to flux valve 90, so that the inputs to phase networks 91, 102 have the same frequency.

A torque motor 105 is connected to gyroscope 104 for precessing the latter about its vertical axis according to the energization fed to the torque motor. One source of this energization is detector 99 which supplies an error signal dependent on the phase difference between the coarse signals provided in the outputs of networks 91, 102. Another source of energization for torque motor 105 is a detector 106 which supplies an error signal dependent on the phase difference between a pair of fine signals respectively provided in the output of frequency multiplier 96 and a like frequency multiplier 107, the latter being connected to receive the output of network 102 via a pair of leads 108, 109. As in all of the preceding embodiments, the fine-error signal is in control of the motor apparatus until the coarse error signal exceeds a predetermined magnitude, whereupon control is automatically transferred to the latter signal. To this end, the output of coarse signal detector 99 is fed via a pair of leads 110, 111 to the winding of an electromagnetic relay 112. In its unactuated state, i. e., when the coarse signal is less than the predetermined magnitude thereof, relay 112 connects the fine-signal output of detector 106 to a power amplifier 113, the output of which is fed via a pair of leads 114, 115 to torque motor 105. When actuated, however, relay 112 opens the connection between detector 106 and amplifier 113 and connects the coarse signal output of detector 99 to the amplifier so that the amplified coarse signal is fed on leads 114, 115 to motor 105.

By the arrangement of Fig. 4, a change of craft heading, for example, results in flux valve 90 and gyroscope 104 respectively providing phase shifts in the supply current. If the phase shifts are different by a relatively large amount, the gyroscope is precessed under control of a coarse error signal. When the difference is reduced to a small amount, further precession to eliminate the difference altogether is under control of a fine-error signal. Thus, the gyroscope is slaved to the flux valve as in conventional magnetically slaved gyroscopic compass systems, except that the phase comparison and fine-coarse techniques of the present invention are employed to accomplish the result. A signal generator 116 having its rotor driven by gyroscope 104 according to movements of the latter relative to the craft about its vertical axis is provided for supplying heading data suitable for use by annunciators, an autopilot, or flight director system, as desired.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A data transmission and control system comprising a source of alternating current of given phase, first means for continuously varying the phase of said alternating current with respect to said given phase in dependence upon variations in data to be transmitted, a positionable object, second means for continuously varying the phase of said alternating current with respect to said given phase in dependence upon variations in the position of said object, said second means including electromotive means for positioning said object, third and fourth means for respectively providing first and second reversible polarity error signals that cyclically vary in magnitude at respectively different rates in dependence upon variations in the phase difference between said alternating current as varied in phase by said first means and as varied in phase by said second means, and means for connecting one of said error signals to said electromotive means in controlling relation, depending on the relative magnitudes of said error signals.

2. A data transmission and control system comprising a source of alternating current of given phase, first means for continuously varying the phase of said alternating current with respect to said given phase in accordance with variations in data to be transmitted, a positionable object, electromotive means for positioning said object, second means for continuously varying the phase of said alternating current with respect to said given phase in accordance with variations in the position of said object, first comparison means for providing a first error signal according to the phase difference between said alternating current as varied by said first means and as varied by said second means, first and second frequency multiplying means having a common multiplication factor for respectively frequency multiplying said alternating current as varied by said first means and as varied by said second means, second comparison means for providing a second error signal according to the phase difference between the respective frequency multiplied currents, and means for connecting one of said error signals to said electromotive means in controlling relation, depending on the relative magnitudes of said error signals.

3. A data transmission and control system comprising a source of alternating current of given phase and having a given frequency, a positionable controller device including a first phase shifter energized from said source for supplying a signal of said given frequency the phase of which is continuously variable with respect to said given phase according to the position of said controller device, a positionable controlled device including a second phase shifter energized from said source for supplying a signal of said given frequency the phase of which is continuously variable with respect to said given phase according to the position of said controlled device, said position signals having a predetermined phase relationship for a given positional relationship between said controller and controlled devices, first phase detector means connected to said first and second phase shifters for providing a first error signal dependent on the phase relationship between the signals supplied by said phase shifters, first and second frequency multipliers respectively connected to receive the signals supplied by said first and second phase shifters for multiplying the given frequency of each of said signals by a common multiplication factor, second phase detector means connected to said first and second frequency multipliers for providing a second error signal dependent on the phase relationship between the frequency multiplied signals in the respective outputs of said frequency multipliers, means for selectively positioning said controller device, and reversible motive means drivably connected to said controlled device and responsive to one of said first and second error signals, depending on the magnitude thereof, for positioning said controlled device to bring about a reduction of said error signals to zero.

4. A data transmission and control system comprising a source of alternating current of fixed frequency and phase, adjustable phase-shifting means having its input connected to said source for supplying a signal in its output of said fixed frequency and of continuously variable phase relative to said source phase according to adjustments imparted thereto, a controller device for adjusting said phase-shifting means in accordance with data to be transmitted, means for providing a first error signal dependent on the phase difference between the fixed frequency output of said source and the output of said phase-shifting means, frequency multiplying means for multiplying the respective outputs of said source and said phase-shifting means by a common multiplication factor, means for providing a second error signal dependent on the phase difference between the frequency multiplied outputs of the respective frequency multiplying means, and reversible motive means drivably connected to said phase-shifting means and responsive to one of said first and second error signals, depending on the magnitude thereof, for adjusting said phase-shifting means to reduce said error signals to zero.

5. A data transmission and control system comprising a source of alternating current of a first fixed phase, first means drivable to continuously vary the phase of said alternating current with respect to said first fixed phase, second means drivable to continuously vary the phase of said alternating current with respect to said first fixed phase, first frequency multiplying means for frequency multiplying said alternating current by a given multiplication factor to produce an output of a second fixed phase, third means drivable to continuously vary the phase of said alternating current as multiplied by said first frequency multiplying means and with respect to said second fixed phase, a positionable object, means including electromotive means for simultaneously positioning said object and for driving said third and second phase-varying means respectively in a speed ratio equal to said multiplication factor, second frequency multiplying means for frequency multiplying by said multiplication factor said alternating current as varied in phase by said first phase-varying means to produce an output varied in phase with respect to said second fixed phase as the output of said first phase-varying means is varied in phase with respect to said first fixed phase, means for providing a first error signal dependent on the phase difference between said alternating current as varied respectively by said first and second phase-varying means, means for providing a second error signal dependent on the phase difference between the phase varied alternating current as frequency multiplied by said second frequency multiplying means and the frequency multiplied alternating current as phase varied by said third phase-varying means, and means for connecting one of said error signals to said electromotive means in controlling relation, depending on the relative magnitude thereof.

6. In a heading data transmission system for a dirigible craft, a source of alternating current of given phase, first means including a flux valve for continuously varying the phase of said alternating current with respect to said given phase according to changes in craft heading, a directional gyroscope, electromotive means for precessing said gyroscope about its vertical axis, second means for continuously varying the phase of said alternating current with respect to said given phase according to movements of said gyroscope about said vertical axis relative to said craft, first and second frequency multiplying means for respectively frequency multiplying by a common multiplication factor said alternating current as phase varied by said first and second phase-varying means, means for providing a first error signal according to the phase difference between said alternating current as phase varied by said first and second phase-varying means, means for providing a second error signal according to the phase difference between said phase varied alternating current as frequency multiplied by said first and second frequency multiplying means, and means for connecting one of said error signals to said electromotive means in controlling relation, depending on the relative magnitudes thereof.

No references cited.